(12) United States Patent
Nakazawa

(10) Patent No.: US 7,690,615 B2
(45) Date of Patent: Apr. 6, 2010

(54) GASKET FOR DOOR MIRROR

(75) Inventor: Yoshitake Nakazawa, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 697 days.

(21) Appl. No.: 11/372,066

(22) Filed: Mar. 10, 2006

(65) Prior Publication Data

US 2006/0163895 A1 Jul. 27, 2006

Related U.S. Application Data

(63) Continuation of application No. 10/645,535, filed on Aug. 22, 2003, now abandoned.

(30) Foreign Application Priority Data

Sep. 6, 2002 (JP) ............................. 2002-261775

(51) Int. Cl.
A47F 5/01 (2006.01)
(52) U.S. Cl. ..................................................... 248/466
(58) Field of Classification Search .............. 248/475.1, 248/476, 479
See application file for complete search history.

(56) References Cited

U.S. PATENT DOCUMENTS

| 3,461,517 | A | | 8/1969 | Eisenhard |
| 4,434,909 | A | * | 3/1984 | Ott ............................ 220/316 |
| 5,090,713 | A | | 2/1992 | Johnson |
| 6,024,364 | A | | 2/2000 | Steffen |
| 6,176,493 | B1 | | 1/2001 | Whipps |
| 6,299,176 | B1 | | 10/2001 | Guzowski et al. ........... 277/604 |
| 6,340,231 | B1 | * | 1/2002 | Polzer ........................ 359/872 |
| 2003/0111802 | A1 | | 6/2003 | Nozaki et al. ............... 277/628 |
| 2003/0168814 | A1 | * | 9/2003 | Struyven et al. ............ 277/402 |
| 2006/0163895 | A1 | * | 7/2006 | Nakazawa .................. 296/1.11 |

FOREIGN PATENT DOCUMENTS

| EP | 0 193 862 A2 | 9/1986 |
| EP | 0 353 475 A1 | 2/1990 |
| FR | 2 766 433 | 1/1999 |
| FR | 2 791 860 | 10/2000 |
| JP | 63-59054 | 4/1988 |
| JP | 2001-150483 | 6/2001 |
| WO | WO 99/00273 | 1/1999 |
| WO | WO 9900273 A1 * | 1/1999 |

* cited by examiner

Primary Examiner—J. Allen Shriver, II
Assistant Examiner—Erin Smith
(74) Attorney, Agent, or Firm—Oblon, Spivak, McClelland, Maier & Neustadt, L.L.P.

(57) ABSTRACT

A gasket for a door mirror according to the present invention is constructed so that when the gasket is interposed and pressed between a mirror base of a door mirror and a mounting seat of a car body, a tip part of a seal lip is pushed against a seating surface of the mounting seat, so as to tilt and bow toward a circumferential portion of the gasket. Then the tip part of the seal lip is resiliently urged against the seating surface of the mounting seat because of its flexibility, so as to seal a clearance between a joint surface of the gasket and the mounting seat of the car body throughout the entire circumference.

7 Claims, 6 Drawing Sheets

GASKET FOR DOOR MIRROR

CROSS REFERENCE TO RELATED APPLICATION

This application is a continuation of U.S. application Ser. No. 10/645,535, filed Aug. 22, 2003, and is based upon and claims the benefit of priority from the prior Japanese Patent Application Number 2002-261775, filed Sep. 6, 2002.

BACKGROUND OF THE INVENTION

1. Field of the Invention

The present invention relates to a gasket for a door mirror interposed between a mirror base of a door mirror and a car body.

2. Related Background Art

In general, a door mirror of a car is mounted so that a mirror base supporting a mirror body is fixed to a mounting seat set on a door or the like of the car body with such fastening devices as bolts and nuts and so that a gasket is normally interposed between the mirror base and the mounting seat of the car body. The door mirror gasket of this type is made of a flexible material, such as polyvinyl chloride or the like, but there is a small clearance made relative to the mounting seat of the car body. Therefore, water might enter the car interior through the clearance during rain or car wash. Air in the car could be forced out through the clearance during a run of the car to make sort of wind noise.

Thus the conventional door mirror gaskets of this type are provided with a seal structure for sealing the clearance relative to the mounting seat of the car body. FIG. 8 shows the seal structure of a door mirror gasket according to a conventional example, in which a rib R continuously extending along the circumference of the gasket G projects on an opposed surface of gasket G, which will face the mounting seat of the car body. Strip seal sponge S covering this rib R is affixed to the opposed surface of the gasket G.

In this conventional seal structure of the door mirror gasket, when the gasket G is interposed between the unrepresented mirror base and the mounting seat of the car body and is pressed against the mounting seat, the seal sponge S is compressed in the directions along its thickness to collapse and, particularly, thinly collapse at the rib R, thereby sealing the clearance between the mounting seat of the car body and the opposed surface of the gasket G.

Another conventionally known seal structure for door mirror is a structure of sealing the clearance with an annular packing, instead of the seal sponge (ex. JP08-188087A).

SUMMARY OF THE INVENTION

The foregoing door mirror gasket as shown in FIG. 7 necessitates the expensive seal sponge S of foam resin and also requires the troublesome work of affixing the seal sponge S along the rib R, which raises the production cost.

On the other hand, the seal structure described in the foregoing official gazette is one without use of the seal sponge, but it is the structure of sealing the circumferential surface between a housing and a rod penetrating it, with the annular packing, which is not applicable to the seal structure for the flat area between the mirror base of the door mirror mounted on the car body, and the car body.

The present invention provides a gasket for door mirror use capable of sealing the clearance in the flat area between the mirror base of the door mirror mounted on the car body, and the car body, without use of the seal sponge.

A gasket for a door mirror according to the present invention is a door mirror gasket, which is intended to be interposed between a mirror base of a door mirror to be mounted on a car body, and the car body, wherein a flexible seal lip continuously extending annularly along the circumferential portion of the gasket is formed on an opposed surface to be opposed to the car body, and the tip part of the seal lip that projects beyond the opposed surface of the gasket is inclined toward the circumferential portion of the gasket.

The tip part of the seal lip may be inclined away from the circumferential portion of the gasket. A portion of the tip part of the seal lip may be inclined toward the circumferential portion of the gasket and another portion of the tip part of the seal lip may be inclined away from the circumferential portion of the gasket.

In the door mirror gasket according to the present invention, the rigidity of the gasket is enhanced by the existence of the seal lip continuously extending annularly along the circumference of the gasket thereof, whereby handleability is improved in the assembly work of interposing the gasket between the car body and the mirror base. When this door mirror gasket is interposed between the car body and the mirror base and is pressed against the car body, the tip of the seal lip is pushed against the car body, whereby the tip of the seal lip bows to be further inclined. Then the tip of the seal lip is resiliently urged against the car body because of its flexibility, so that the seal lip can seal the clearance through the entire periphery between the opposed surface of the gasket and the car body.

In the door mirror gasket according to the present invention, a clearance groove that can accommodate the seal lip is preferably formed on the opposed surface along a peripheral surface of the seal lip on the side of the seal lip toward which the seal lip is inclined. When the seal lip is pushed up to its root part to be deflected to the maximum deflection, the clearance groove can accommodate the seal lip, so as to prevent breakage of the root part of the seal lip, for example. In this case, the bottom surface of the clearance groove is preferably continuous through a curved surface to the surface of the root part of the seal lip; this structure can circumvent stress concentration on the peripheral surface of the root part of the seal lip and effectively prevent the breakage of the root part of the seal lip or the like.

A stress relief groove of a curved cross section continuous to a surface of the root part of the seal lip is preferably formed on the opposed surface adjacent to the root part of the seal lip on the side of the seal lip away from which the seal lip is inclined; when the seal lip is deflected to the maximum deflection, this structure can circumvent stress concentration on the peripheral surface of the root part of the seal lip and prevent the breakage of the root part of the seal lip or the like more effectively.

DETAILED DESCRIPTION OF THE PREFERRED EMBODIMENTS

An illustrative embodiment of the door mirror gasket according to the present invention will be described below with reference to the drawings. Among the drawings referred to, FIG. 1 is a perspective view of the door mirror gasket according to an embodiment of the present invention, from the joint surface side to the car body, and FIG. 2 a partly enlarged sectional view of the door mirror gasket along line II-II in FIG. 1.

Figure 1:
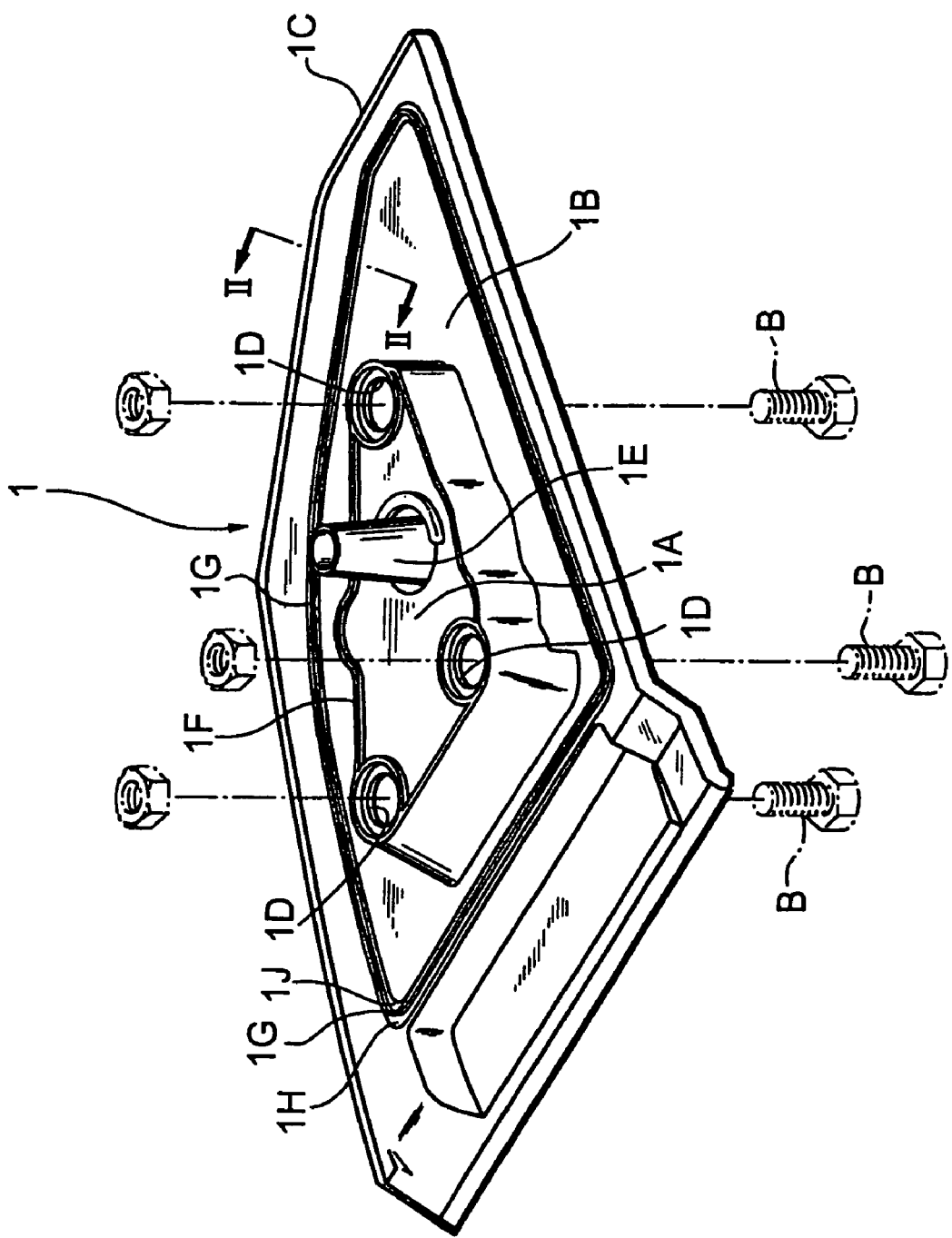
FIG. 1 is a perspective view of the door mirror gasket according to an embodiment of the present invention, from the joint surface side to the car body.
Figure 2:
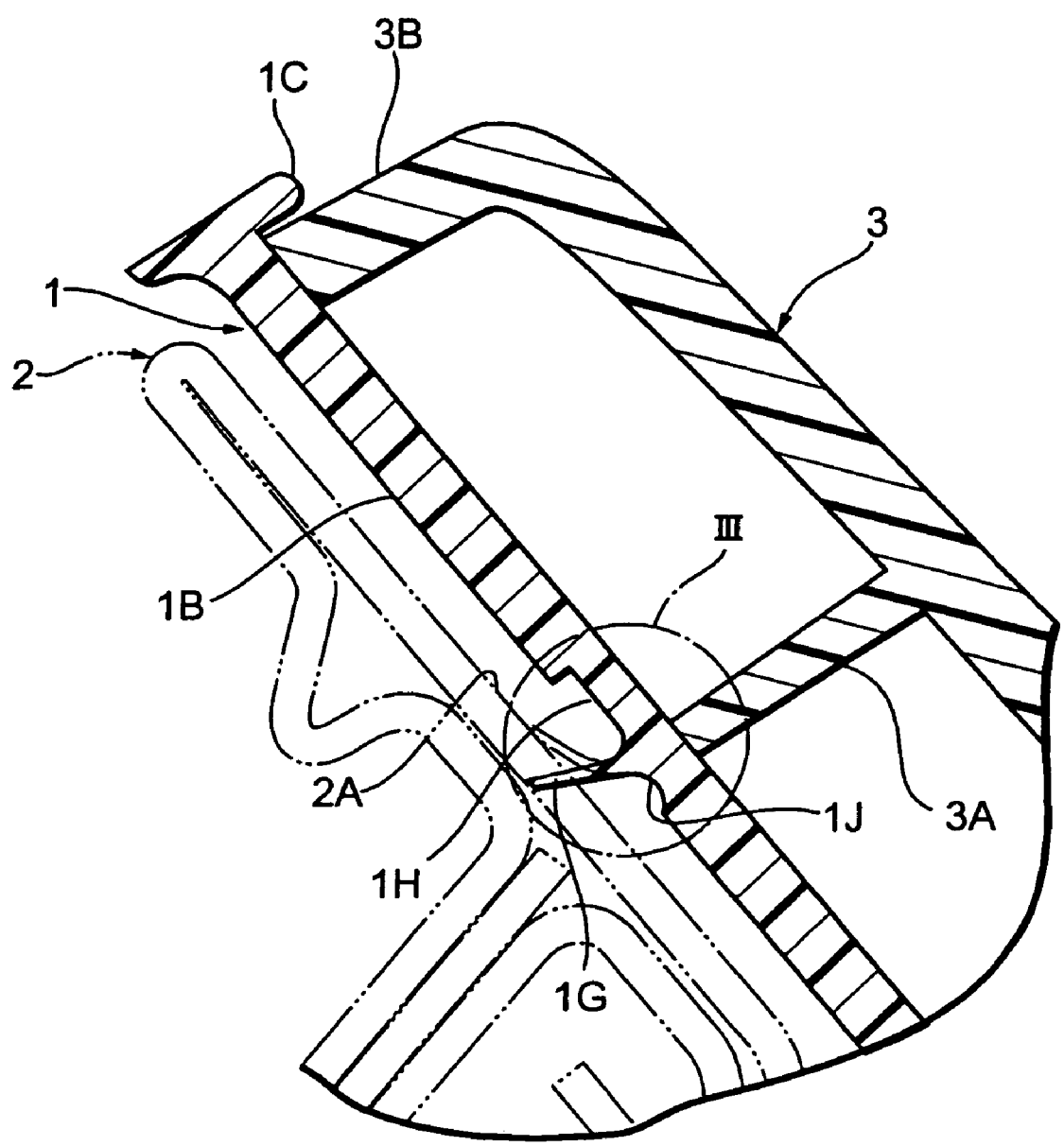
FIG. 2 is a partly enlarged sectional view of the door mirror gasket along line II-II in FIG. 1.

As shown in FIGS. 1 and 2, the door mirror gasket (hereinafter referred to simply as a gasket as occasion demands) 1 according to the embodiment is a gasket intended to be interposed between mounting seat 2 of plate metal set on a door or the like of a car body, and mirror base 3 of a door mirror to be fixed through bolts and nuts to the mounting seat 2. This gasket 1 is made of a flexible material, for example, PE (polyethylene), PVC (polyvinyl chloride), an elastomer, or the like.

In the central region of the gasket 1, mounting base 1A for mounting on the mounting seat 2 of the car body bulges out from the opposed surface 1B to be opposed to the mounting seat 2. Lip 1C for blindfold projecting on the both sides is formed in the circumferential portion of the gasket 1.

The mounting base 1A is provided with three bolt passing holes 1D corresponding to three bolts B for fixing the mirror base 3 of the door mirror to the mounting seat 2 of the car body; and a passing cylinder 1E through which a wiring harness guided out of the mirror body (not shown) of the door mirror passes. Inner seal lip 1F capable of closely fitting seat face 2A of the mounting seat 2 is formed in the marginal region of the mounting base 1A and in the marginal regions of the respective bolt passing holes 1D.

The opposed surface 1B of the gasket 1, which will face the seat face 2A of the mounting seat 2 of the car body, is provided with a flexible seal lip 1G continuously extending annularly along the lip 1C at the circumferential portion of the gasket 1, a clearance groove 1H that can accommodate the seal lip 1G extending along an outer periphery surface of the seal lip 1G, and a stress relief groove 1J continuous to an inner surface of the root part of the seal lip 1G and extending along the seal lip 1G. In correspondence thereto, the mirror base 3 is provided with a backup rib 3A, which is brought into contact with a portion corresponding to the position of the seal lip 1G, in the surface on the opposite side to the opposed surface 1B of the gasket 1.

Figure 3:
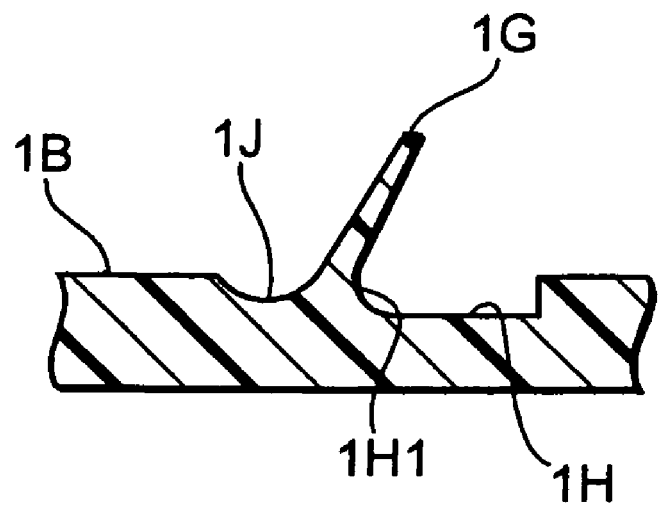
FIG. 3 is a partial sectional view showing an initial state of the seal lip as indicated in part III in FIG. 2.

The seal lip 1G is formed along the lip 1C and approximately 10 to 30 mm inside the lip 1C at the circumferential portion of the gasket 1. This seal lip 1G is of a sectional shape tapered from the root part toward the tip part, as shown in FIG. 3. The tip part of the seal lip 1G that projects beyond the opposed surface 1B of the gasket 1 in its initial state is inclined, for example, at the angle of approximately 30° toward the circumferential portion of the gasket 1. The projection height of the seal lip 1G from the opposed surface 1B is set to approximately 1 mm.

The clearance groove 1H has the width and depth enough to accommodate the seal lip 1G at the maximum deflection of the seal lip 1G. In order to circumvent the stress concentration on the outer surface of the root part at the maximum deflection of the seal lip 1G, the bottom surface of the clearance groove 1H is continuous through curved surface 1H1 to the outer surface of the root part of the seal lip 1G. The radius of curvature of this curved surface 1H1 is set, for example, to approximately 0.3 mm.

The stress relief groove 1J is a groove of a curved cross section continuous to the inner surface of the root part of the seal lip 1G and circumvents the stress concentration on the inner surface of the root part at the maximum deflection of the seal lip 1G. The radius of curvature of the curved cross section of the stress relief groove 1J is set, for example, to 0.5 mm.

In the door mirror gasket 1 of the embodiment constructed as described above, the rigidity of the gasket 1 is enhanced by the existence of the seal lip 1G continuously formed along and the lip 1C, in addition to the lip 1C formed in the circumferential portion of the gasket 1. For this reason, the handleability of the gasket 1 is improved in the assembly work of interposing the gasket 1 between the mounting seat 2 of the car body and the mirror base 3.

During the work of fixing the mirror base 3 to the mounting seat 2 of the car body through bolts and nuts, the gasket 1 is interposed and held between the mounting seat 2 and the mirror base 3 to be pressed against the seating surface 2A of the mounting seat 2, as shown in FIG. 2. On that occasion, the seal lip 1G of the gasket 1 tilts with certainty toward the circumferential portion of the gasket 1 throughout the entire circumference, so as to prevent the gasket 1 from laterally shifting relative to the mirror base 3, whereby the positional relation remains stable between the outer periphery 3B of the mirror base 3 and the lip 1C.

Figure 4:
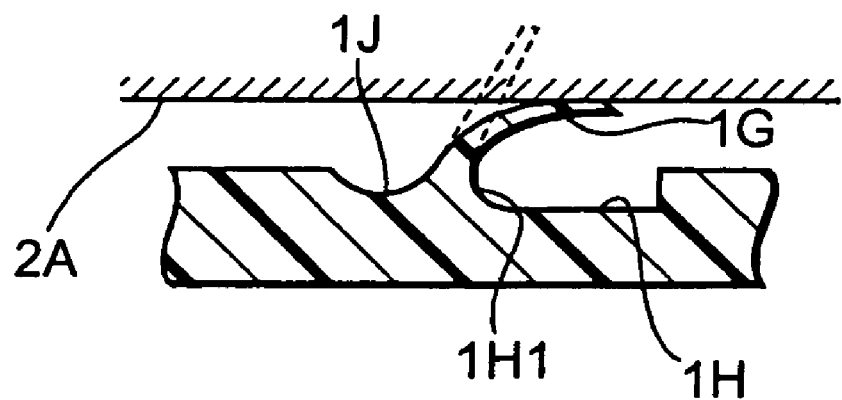
FIG. 4 is a partial sectional view showing a standard deflection state of the seal lip shown in FIG. 3.

In the door mirror gasket 1 of the embodiment mounted in this way, as shown in the enlarged view of FIG. 4, the tip part of the seal lip 1G is pushed against the seating surface 2A of the mounting seat 2 so that the seal lip 1G tilts to bow toward the circumferential portion of the gasket 1. Then the tip part of the seal lip 1G is resiliently urged against the seating surface 2A of the mounting seat 2 because of the flexibility of the lip, whereby the seal lip 1G seals the clearance between the joint surface 1A of the gasket 1 and the seating surface 2A of the mounting seat 2 throughout the entire circumference.

Figure 5:
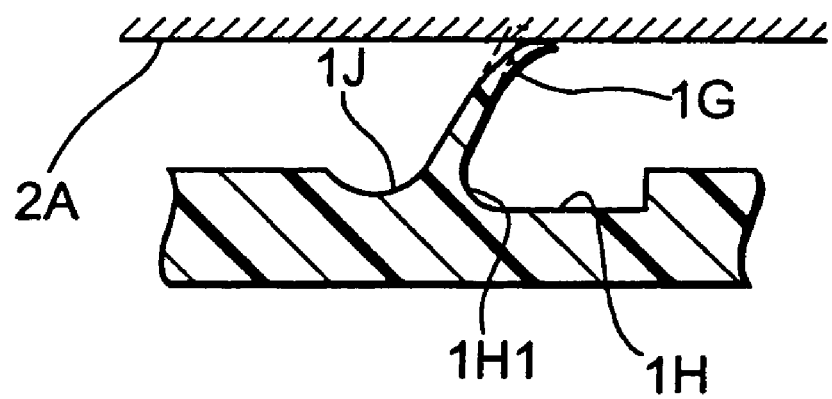
FIG. 5 is a partial sectional view showing a minimum deflection state of the seal lip shown in FIG. 3.

On that occasion, the seal lip 1G closely fits the seating surface 2A of the mounting seat 2 in a state in which the tip part thereof is inclined toward the circumferential portion of the gasket 1, whereby it can surely prevent rain and others from entering the interior. This seal effect is also achieved similarly in the case of the deflection amount of the seal lip 1G being small as shown in FIG. 5, or in the case of the deflection amount of the seal lip 1G being large as shown in FIG. 6.

Figure 6:
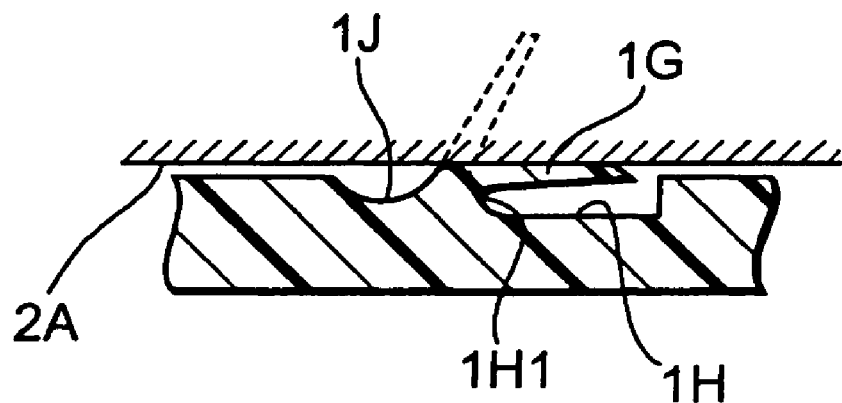
FIG. 6 is a partial sectional view showing a maximum deflection state of the seal lip shown in FIG. 3.

At the maximum deflection where the seal lip 1G is pushed entirely up to the root part by the seating surface 2A of the mounting seat 2, as shown in FIG. 6, the clearance groove 1H accommodate the seal lip 1G therein. On that occasion, the stress concentration is circumvented on the outer surface of the root part of the seal lip 1G, because the bottom surface of the clearance groove 1H is continuous through the curved surface 1H1 to the outer surface of the root part of the seal lip 1G. Since the stress relief groove 1J of the curved cross section is continuous to the inner surface of the root part of the seal lip 1G, the stress concentration is also circumvented on the inner surface of the root part of the seal lip 1G. Accordingly, the breakage of the root part of the seal lip 1G or the like is effectively prevented in the door mirror gasket 1 of the embodiment.

The door mirror gasket according to the present invention is not limited to the foregoing embodiment. For example, the outline of the seal lip 1G can be properly changed according to the shape of the circumference of the gasket 1. The projection height of the seal lip 1G from the opposed surface 1B of the gasket 1 can also be altered as occasion demands.

Figure 7:
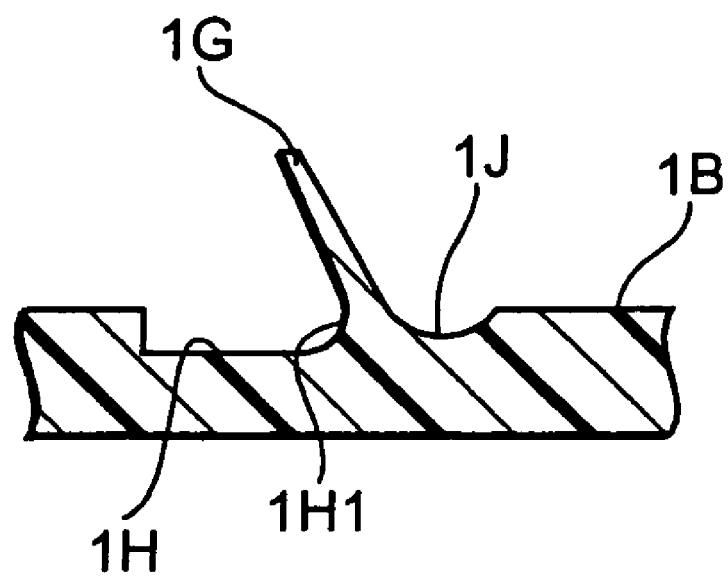
FIG. 7 is a partial sectional view of a modification example corresponding to FIG. 3.
Figure 8:
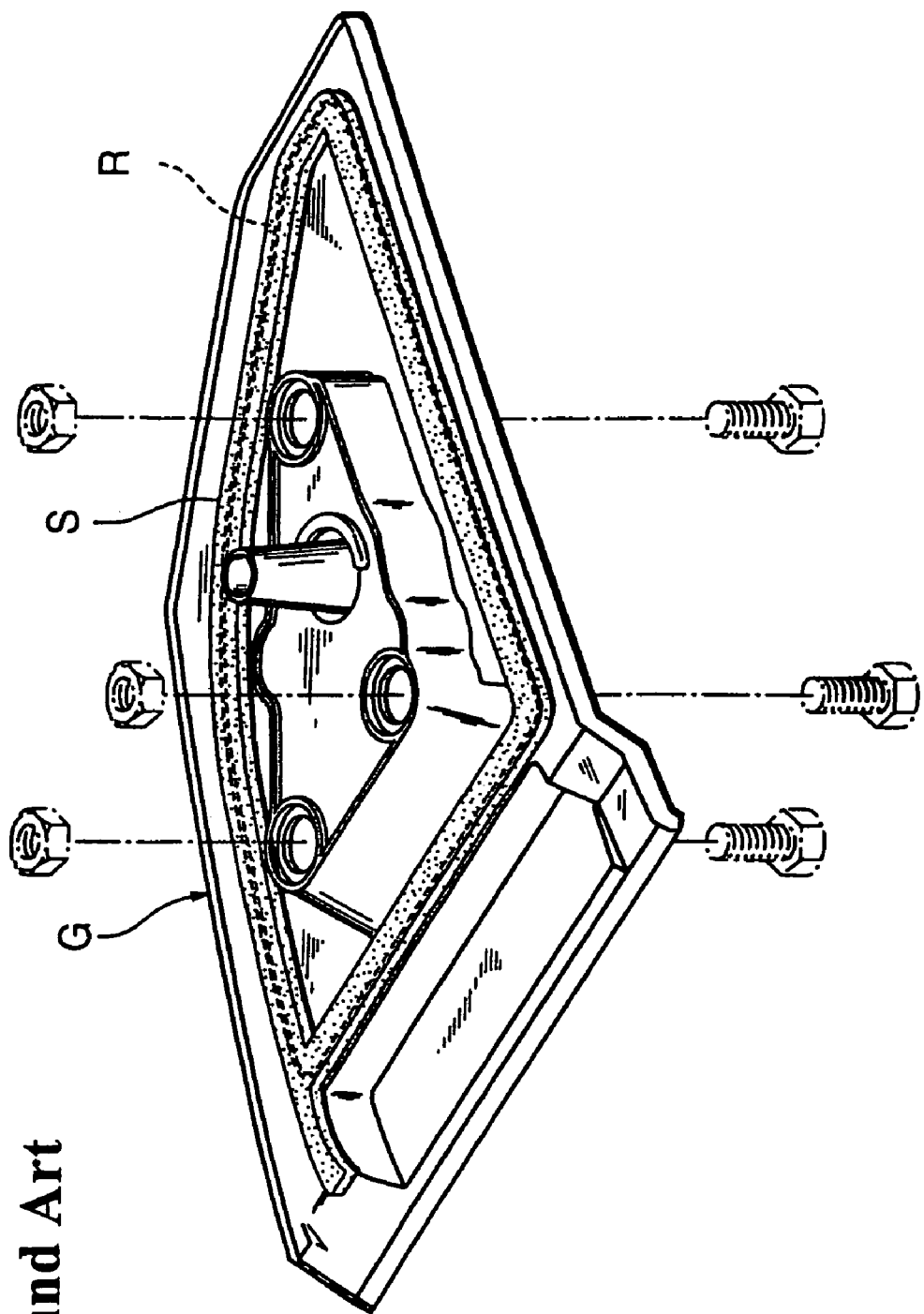
FIG. 8 is a perspective view of the conventional example corresponding to FIG. 1.

Furthermore, the seal lip 1G in the initial state may be inclined away from the circumferential portion of the gasket 1, as shown in FIG. 7. In this case, the clearance groove 1H is formed along the inner peripheral surface of the seal lip 1G. And the stress relief groove 1J is formed along and adjacent to the outer surface of the root part of the seal lip 1G.

The seal lip 1G in the initial state may also be inclined in the combination mode: A portion of the tip part of the seal lip 1G may be inclined toward the circumferential portion of the gasket 1 and another portion of the tip part of the seal lip 1G may be inclined away from the circumferential portion of the gasket 1. For example, potential arrangement examples are as follows: a longitudinal portion of the seal lip 1G is inclined toward the circumferential portion of the gasket 1, while the other portion is inclined away from the circumferential portion of the gasket 1; conversely, a longitudinal portion of the seal lip 1G is inclined away from the circumferential portion of the gasket 1, while the other portion is inclined toward the circumferential portion of the gasket 1.

Since the rigidity of the gasket is enhanced by the existence of the seal lip continuous along the inside of the peripheral edge thereof, the door mirror gasket according to the present invention provides the improved handleability in the assembly work of interposing the gasket between the car body and the mirror base. When this door mirror gasket is interposed between the car body and the mirror base to be pressed against the car body, the tip part of the seal lip is pushed against the car body, whereby the tip part of the seal lip bows to be further inclined. Then the tip part of the seal lip is resiliently urged against the car body because of its flexibility, so as to seal the clearance between the opposed surface of the gasket and the car body throughout the entire circumference.

Accordingly, the door mirror gasket according to the present invention can seal the clearance in the flat region between the mirror base of the door mirror mounted on the car body, and the car body, without use of the seal sponge, so as to obviate the need for the seal sponge and the affixing work thereof and thereby reduce the production cost. It is also feasible to improve the handleability in the assembly work.

What is claimed is:

1. A door mirror assembly for a vehicle, comprising:
a mirror base to be mounted on a vehicle body and having a side positioned to face the vehicle body, the side having a backup rib; and
a gasket detachably provided on the side of the mirror base and comprising a gasket plate having a surface positioned to face the vehicle body and another surface opposite to the surface, and a flexible seal lip provided on the surface of the gasket plate and positioned to correspond to the backup rib brought into contact with a portion of the another surface of the gasket plate, the flexible seal lip projecting from the surface and being formed along a circumferential portion of the gasket plate such that the flexible seal lip tilts to bow when pushed against a seating surface of a mount seat.

2. The door mirror assembly according to claim 1, wherein the surface of the gasket plate has a clearance groove which is formed along a bottom peripheral of the flexible seal lip so as to accommodate the flexible seal lip when bent.

3. The door mirror assembly according to claim 2, wherein the clearance groove has a bottom surface which is continuously formed with a curved bottom surface of the flexible seal lip.

4. The door mirror assembly according to claim 1, wherein the surface of the gasket plate has a stress relief groove which is formed along a bottom peripheral of the flexible seal lip, and the stress relief groove has a surface being curved into the gasket plate and continuously formed with a curved bottom surface of the flexible seal lip.

5. The door mirror assembly according to claim 2, wherein the surface of the gasket plate has a stress relief groove, the stress relief groove is formed along a bottom peripheral of the flexible seal lip, which is opposite to the bottom peripheral of the flexible seal lip along which the clearance groove is formed, and the stress relief groove has a surface being curved into the gasket plate and continuously formed with a curved bottom surface of the flexible seal lip.

6. The door mirror assembly according to claim 3, wherein the surface of the gasket plate has a stress relief groove, the stress relief groove is formed along a bottom peripheral of the flexible seal lip, which is opposite to the bottom peripheral of the flexible seal lip along which the clearance groove is formed, and the stress relief groove has a surface being curved into the gasket plate and continuously formed with a curved bottom surface of the flexible seal lip.

7. A door mirror assembly for a vehicle, comprising:
a mirror base to be mounted on a vehicle body and having a side positioned to face the vehicle body, the side having a backup rib; and
a gasket detachably provided on the side of the mirror base and comprising a gasket plate having a surface positioned to face the vehicle body and another surface opposite to the surface, and sealing means for sealing a clearance between the surface of the gasket and a seating surface of a mount seat throughout a circumferential portion of the gasket plate,
wherein the sealing means is positioned to correspond to the backup rib brought into contact with a portion of the another surface of the gasket plate.

* * * * *